United States Patent
Terai et al.

[15] 3,696,879
[45] Oct. 10, 1972

[54] HEAVY BULLDOZER

[72] Inventors: Akio Terai; Eiji Kawamura; Hisashi Fukumoto; Hidekatsu Aoki, all of Osaka, Japan

[73] Assignee: Kabushiki Kaisha Komatsu Seisakusho, Tokyo, Japan

[22] Filed: May 26, 1970

[21] Appl. No.: 40,555

[30] Foreign Application Priority Data

May 31, 1969 Japan.....................44/42663
Oct. 15, 1969 Japan.....................44/81879

[52] U.S. Cl.................................180/9.48, 180/9.5
[51] Int. Cl. ............................................B62d 55/06
[58] Field of Search...............180/9.62, 9.5, 9.48, 9.6

[56] References Cited

UNITED STATES PATENTS

| | | |
|---|---|---|
| 2,272,286 | 2/1942 | Baker et al. .................180/9.6 |
| 2,763,330 | 9/1956 | Potter........................180/9.48 |
| 3,205,961 | 9/1965 | Nolte.........................180/9.48 |
| 3,171,294 | 3/1965 | Mazzarins..............180/9.62 X |
| 3,312,291 | 4/1967 | Haug ....................180/9.48 X |
| 2,681,231 | 6/1954 | Kondracki.................180/9.48 |
| 3,036,650 | 5/1962 | Cimino ..................180/9.48 X |

FOREIGN PATENTS OR APPLICATIONS 153,410 11/1920 Great Britain...............180/9.5

*Primary Examiner*—Benjamin Hersh
*Assistant Examiner*—John A. Pekar
*Attorney*—Cushman, Darby & Cushman

[57] ABSTRACT

The present invention relates to heavy bulldozer which comprises connecting the right and left belt assemblages through laterally horizontal pivot shaft in such a manner that said belt assemblages can be independently moved up and down, providing upper half circular bearing on the rear lower surface of the body, sealing said bearing with the lower half circular bearing cap capable of connecting or disconnecting said bearing, providing the upper half circular bearing on the front lower surface of the body on the equalizer pin provided in the center of the equalizer bar for connecting the right and left truck frames, and sealing said bearing with removable lower half circular bearing cap wherein said heavy bulldozer can be disassembled into main body portion and the endless track portion, and can be freely transported by reducing the weight and the height thereof, providing bolt or cylinder to be screwed into the end of the above mentioned pivot shaft, on said end surface of the pivot shaft, so that the interval between the right and left belt assmblages can be changed by operating said bolt or cylinder, to easily separate the main body portion and the endless track portion, and at the same time the width of the right and left belt assemblages can be reduced to the effect that the heavy bulldozer can be easily transported.

5 Claims, 12 Drawing Figures

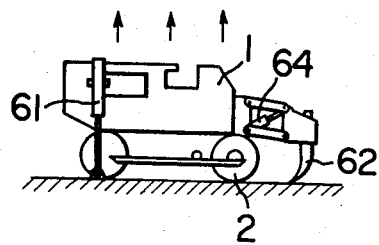
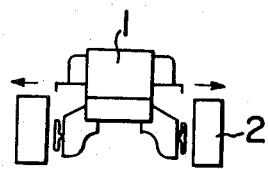
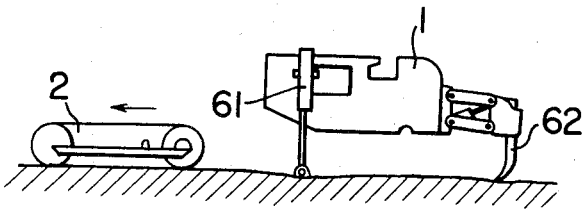
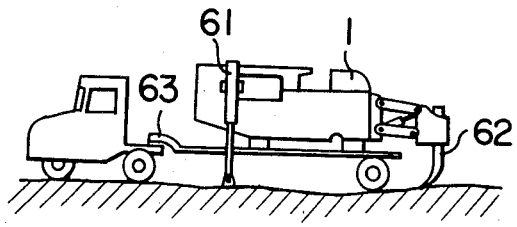

HEAVY BULLDOZER

The present invention relates to heavy bulldozer, and more in particular the present invention relates to heavy bulldozer having such a structure that the main body and the endless track portion can be easily separated.

Recently, the large sized bulldozers have come to meet the bottle neck of the production in spite of the big demands of construction field for heavy bulldozers, because it is very difficult to transport large sized bulldozers.

In other words, when bulldozers are transported by means of trains, or trailers miniature bulldozers can be transported in their perfect form, but in the case of large sized bulldozers, they cannot be transported in their full size because of the weight and height thereof.

Therefore, when large sized bulldozers are transported, attachments such as blade, lipper and the like are removed from the main body and they are transported in their disassembled state.

However, when much larger bulldozers are transported, the weight, height and width thereof go beyond the limit of transportation even when the attachment are disassembled, and therefore as is shown in FIG. 1, two bulldozers A and B are separatably longitudinally connected, and the radius of rotation thereof is increased, and only a pusher can be used for transporting the 63 bulldozers, and on the other hand, as is shown in FIG. 2, when a bulldozer is divided into two, i.e., the right and left portions C and D, in such a manner that the bulldozer can be freely assembled or disassembled, the joint of the right and left portions C and D becomes weak, and the width of the body is increased, and therefore the width of the blade must be prepared to be wider, and the digging efficiency is lowered, and the strength of the blade can be lowered, and therefore there are a number of problems to be solved.

The main object of the present invention is to solve the aforementioned various problems and to provide a heavy bulldozer which is easily separated for transportation but which does not lose in performance and strength thereby. That is, upon transportation thereof, the main body portion and the endless track system of one bulldozer may be easily separated into upper and lower portions, and when the main body portion and the endless track portion are connected, a heavy bulldozer having the same qualities as a non-separated heavy bulldozer is provided.

Another important object of the present invention is to provide a heavy bulldozer capable of freely changing the interval between the right and left assembles in the endless track portion.

Another object of the present invention is to provide a heavy bulldozer capable of self-driving with the endless track system so as to facilitate easy separation of the main body portion and the endless track system and easy loading onto a trailer.

Another object of the present invention is to provide a heavy bulldozer wherein the body removed of the endless track assemblage can be supported in such a manner that said body can be moved horizontally and also in up and down direction.

Another object of the present invention is to provide a heavy bulldozer having simple variable speed gear of simple structure.

Other objects of the present invention will be clear to those skilled in the art from the descriptions given in the following paragraphs.

Figure 5A:
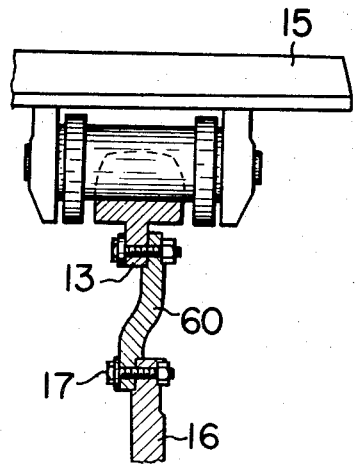

FIG. 5A and B are the diagrams showing the front view of the partially longitudinal cross sectional view of the main portion of the factor having sprockets are provided by facing the same outside and inside out.

Figure 1:
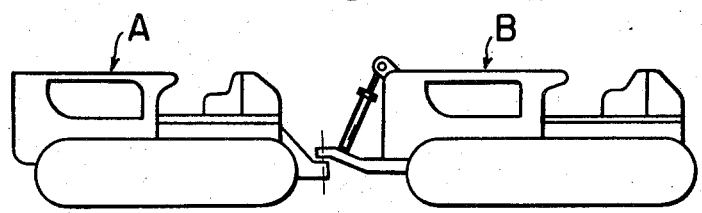
FIG. 1 is the side view of the conventional heavy bulldozer of longitudinally connected type.
Figure 2:
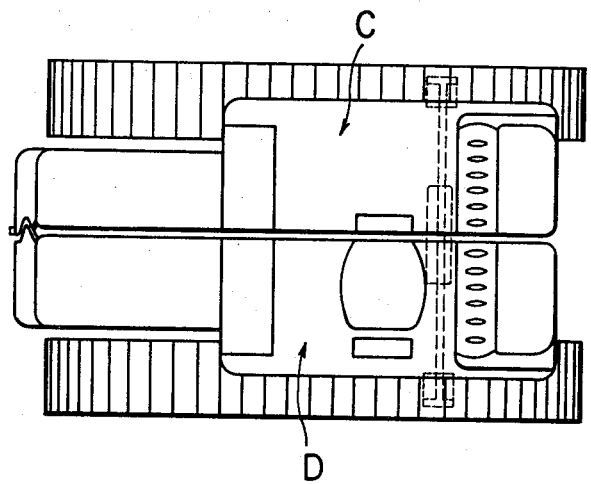
FIG. 2 is the ground plane of the conventional heavy bulldozer capable of being divided into right and left portions.
Figure 3:
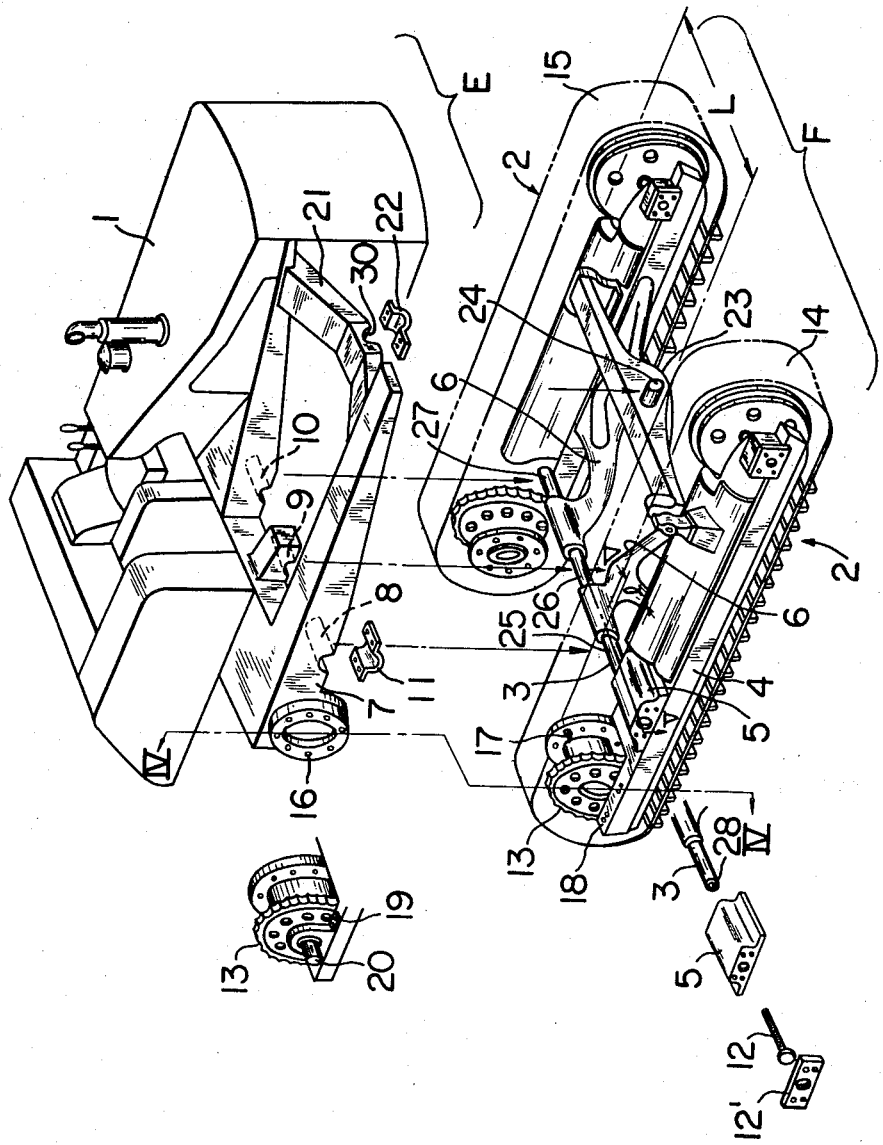
FIG. 3 is an aslant view of the embodiment of the heavy bulldozer of the present invention having the dividable structure.
Figure 6:
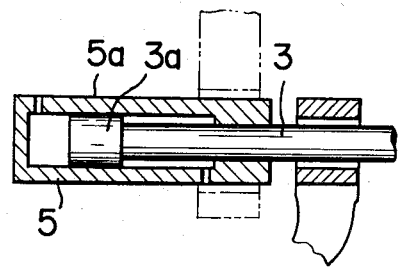
Figure 11:
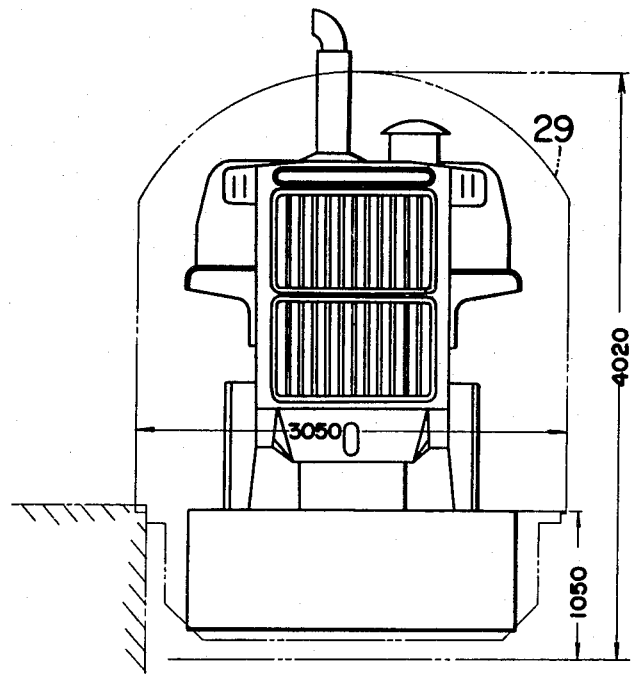

FIG. 6 is a diagram showing the cross sectional view of the internal surface of the bearing casing along V—V line of FIG. 3 when the internal surface of said bearing casing is made as the oil pressure cylinder;

FIG. 7 is a diagram showing the side view of the bulldozer of the present invention wherein the body is supported with the cylinder for lifting blade and the lipper;

FIG. 8 is a diagram showing the back view of the belt assemblage of the endless track portion wherein said belt assemblage is spread outside;

FIG. 9 is a diagram showing the side view of the endless track portion removed of the body;

FIG. 10 is a diagram showing the side view of the body placed on a trailler; and FIG. 11 is the front view of the tractor showing the relation of the fourth limitation of Japan National Railways Corporation as an example of the limitation of transportation.

The present invention attains the above mentioned objects and the gist of the present invention resides in the heavy bulldozer which comprises providing diagonal braces extending towards a little beyond the sprocket provided on the truck frame, towards internal rear portion of said truck frame on the middle of the inside of said truck frame provided with said sprocket on one end-portion thereof, connecting the right and left belt assemblages through the pivot shaft which is horizontal in the right and left directions, wherein said pivot shaft is supported with the bearing casing fixed on said truck frame and the end of said diagonal brace, at a little before said sprocket, providing said pivot shaft between said bearing casing and diagonal brace, and between the right and left diagonal braces in such a manner that a predetermined length of said shaft can be exposed, providing the lower surface of the rear portion of the main body with the upper half circular bearing to be provided on said exposed portion, and the lower half circular bearing cap capable of being removed for sealing said bearing, providing the lower surface of the front portion of the body with the upper half circular bearing to be provided on the pin of the equalizer, and the lower half circular bearing cap capable of being removed for sealing said bearing, and connecting said sprocket to output flange of the body with bolt in such a manner that said sprocket can be connected to or disconnected from said output flange.

Therefore, it is possible to separate the main body portion and the endless track portion by disconnecting the connection of said sprocket and the output flange, and the weight and the height of the bulldozer can be reduced, and therefore the transportation thereof becomes very easy.

In accordance with the present invention, screw hole is provided on both end surface of said pivot shaft, and the bolt whose head portion is fixed on the outer end surface of said bearing box is screwed into said screw hole, or both ends of said pivot shaft are formed on the piston head, and the interval between the right and left assemblages can be easily changed by operating the bolt or cylinder with the member prepared by inserting said piston head into the cylinder formed on the internal surface of said bearing, and therefore it is possible to more easily separate the main body from the endless track portion, and the width of the right and left assemblages can be reduced to the effect that transportation of the bulldozer can be easier.

In addition to the above, in accordance with the present invention, the variable speed gear cum sprocket bearing and motor are fixed on said truck frame, so that endless track alone can be driven, and therefore the separation of the main body portion and the endless track portion can be made much easier.

Moreover, the cylinder for lifting blade and lipper are provided on the front and rear side of the main body, so that the main body can be supported in such a manner that it can be moved horizontally and in the up and down directions, and therefore it is possible to lift the body without using crane or the like, and therefore it is possible to separate endless track portion as the main body can be lifted without using a crane or a separate machine.

Other features and advantages of the present invention will be clarified to those skilled in the art from the detailed descriptions of a preferable embodiment of the present invention in accordance with the attached diagrams.

The following is an embodiment to further illustrate the present invention.

The structure of the bulldozer of the present invention is explained in FIG. 3, and the bulldozer of the present invention is composed of pivot shaft group becoming the center of the oscillation within the perpendicular surface of the belt assemblage by connecting the right and left belt assemblage 2, 2 and removable equalizer. (In FIG. 3, E is the body portion, and F is the endless track portion.)

The following is an explanation about the pivot shaft group.

The pivot shaft 3 is the laterally horizontal shaft having the function corresponding to the conventional sprocket shaft and is rotatably provided through the bearing casings 5, 5 fixed on a little forward portion of the sprocket 13 of the truck frame 4 to connect the right and left belt assemblages 2, 2 rotatable round said pivot shaft 3.

When the right and left ends of the pivot shaft 3 are provided on the bearing casings 5, 5, the right and left belt assemblages 2, 2 are connected in such a manner that the interval L of the right and left belt assemblages 2, 2 can be changed.

In other words, one of the structures as is shown in FIG. 3, the bolt 12 whose head is fixed on the plate 12' fixed on the end surface of the bearing casing 5 is screwed into the screw hole 28 provided on the end surface of the pivot shaft 3, and by moving the bolt 12 back and forth, the interval L of the belt assemblages 2, 2 can be changed, and in another structure, as is shown in FIG. 6, the both ends of the pivot shaft 3 are made into the piston heads 3a, 3a, and the internal surface of the bearing casing 5, 5 are made in the form of cylinder, and the piston head 3a, 3a is inserted thereinto to form the oil cylinder 5a.

By sending oil to the cylinder 5a, the interval L between the belt assemblages 2, 2 can be changed.

The diagonal braces 6, 6 extending towards the rear portion in front of the above mentioned pivot shaft 3 inside the two truck frames 4, 4 and said diagonal braces 6, 6 support said pivot shaft 3 at the inside distance $l$ from said right and left bearing casings 5, 5 to give right and left strength to the right and left truck frames 4, 4.

Thus, the exposed portion of the pivot shaft 3 is respectively present on three portions, i.e., 25, 27 between the right and left bearing casings 5, 5 and the diagonal braces 6, 6, and on the position 26, i.e., between the 25, 27 and the right and left diagonal braces 6, 6.

On the lower surface of the body 1, the upper half circular bearings 8, 9, 10 to be connected to the upper half portions of the exposed portions 25, 26 and 27 at the positions corresponding to the above mentioned exposed portions 25, 26 and 27 are provided, and the body 1 is provided on the pivot shaft 3 and the lower half portions are sealed with the bearing caps 11, 11 and 11.

When the bulldozer of the present invention is transported by dividing the same, the body 1 is removed upwards, and then the bolt 12 screwed into the screw hole 28 provided on the end surface of the pivot shaft 3, is screwed, or oil is sent into the oil pressure cylinder 5a, the right and left belt assemblages 2, 2 are brought closer by the length of the exposed portion 26 of the pivot shaft 3 to have the maximum width within the limit of transportation (such as 3,050 mm stipulated by Japan National Railways Corporation; refer to No. 29, Code 11).

Figure 4:
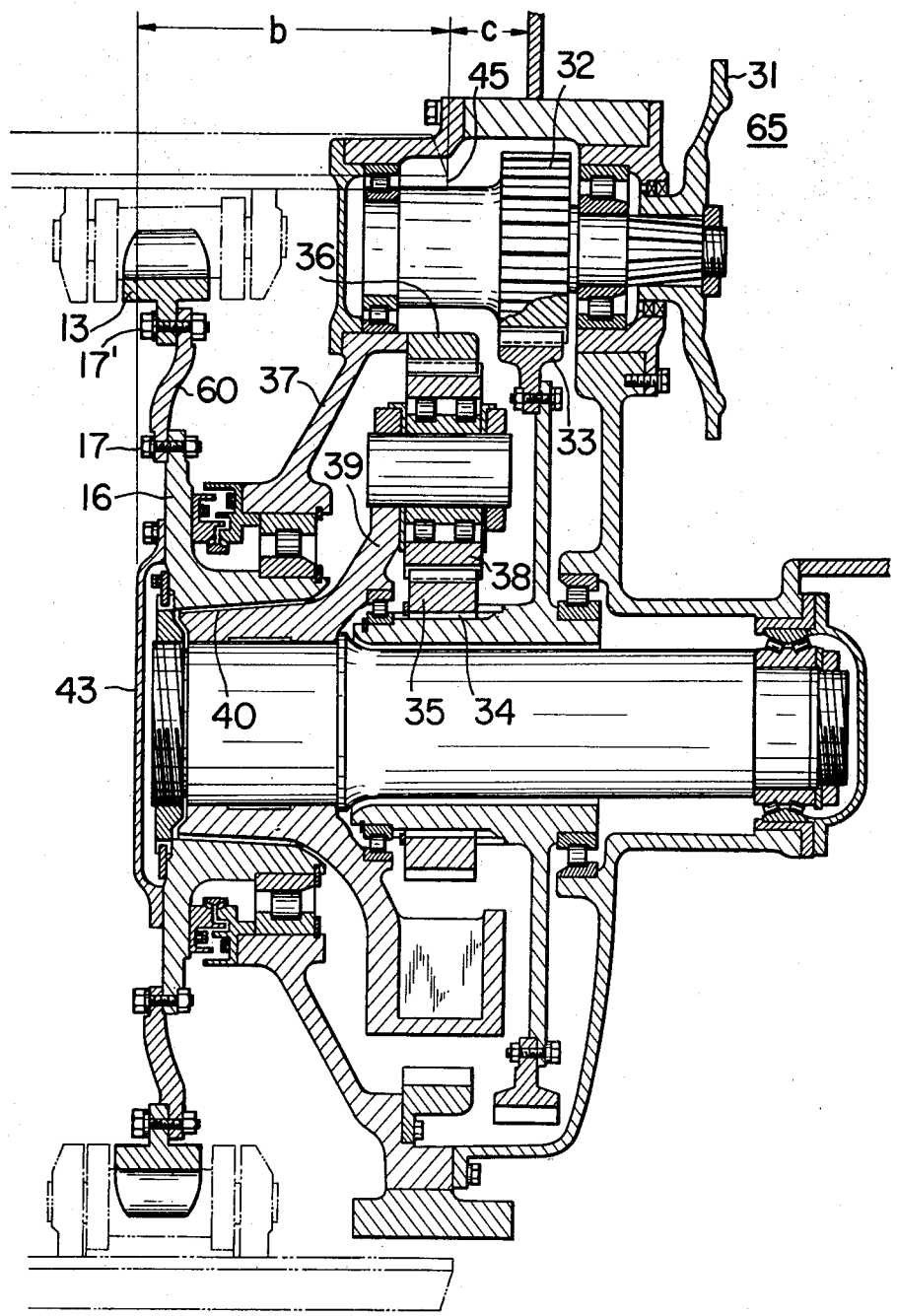
FIG. 4 is the longitudinal cross sectional view of the variable speed gear along IV—IV line of FIG. 3.

The operation of the variable speed gear 65 for driving sprocket is explained in accordance with the diagram of FIG. 4.

The input transmitted from the transmission through the bevel pinion gear (not shown) drives the input flange 31.

The input transmitted to the gear 33 from the pinion 32 connected to the input flange 31 through spline is transmitted to the sun-gear 35 of the planetary gear through the spline 34.

The ring gear 36 is fixed on the cover in said planetary gear, and therefore the input coming into the sun-gear 35 drives the carrier 39 through the planetary gear 38.

Said carrier 39 is connected to the output flange 16 connected to the sprocket 13 through the bolt 17, the connecter board 60, and the bolt 17' with the taper separation 40, and therefore the transmitted force drives the sprocket 13 finally.

Thus, the sprocket 13 is connected to the output flange 16 on the side of the body 1 with bolt 17 in such a manner that said sprocket 13 can be freely connected to or disconnected from said output flange 16 (see FIG. 3 and FIG. 4), and it cannot be removed from the belt assemblage 2.

Namely, after having separated the endless track portion F after the connecter board 60 from the body by removing the bolt 17, the endless track portion is displaced outside by the distance b by means of the bolt 12 or oil pressure cylinder 5a, and when it comes out of the outer most end 43 of the body from the internal end 45 of the belt, the body is lifted, and the endless track portion is separated.

Figure 5B:
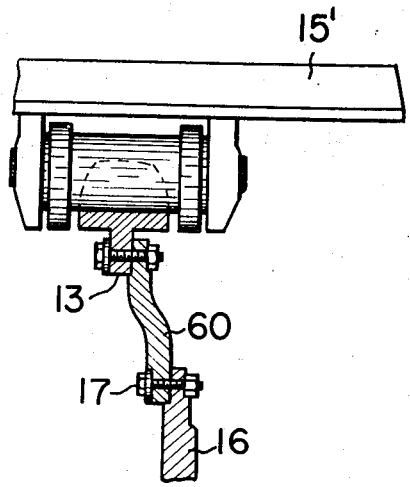

On the other hand, the width belt 15' is provided, the connecter board 60 is reversed as is shown in FIG. 5B to be provided thereon (or exchanged) and the interval C between the body and the belt is kept to be constant.

On the other hand, after having separated the endless track portion F from the body 1, the variable speed gear 19 playing the role of the bearing of the sprocket 13, and electromotive or oil pressure motor 20 is provided on the surface 18 of the truck frame 4 (see FIG. 3), and the sprocket 13 is driven by the force of the motor 20 to the effect that the endless track portion F after having reduced the width thereof can be operated and can be placed on the trailer.

In regard to the oil pressure in this case it can be given from the oil pressure pump within the body 1 through a flexible hose.

The following is an explanation about equalizer.

The structure of the equalizer is the same as that of the conventional equalizer, and therefore the explanation about it is omitted in this specification, but as is shown in FIG. 3, removable equalizer bar 23 is provided for connecting the right and left truck frames 4 as is shown in FIG. 3, and the upper half circular bearing 30 provided on the lower surface of the body 1 is provided on the equalizer pin 24, and the lower half thereof is sealed with the bearing cap 22.

Therefore, when the bearing cap 22 is removed, the body can be easily separated from the pin 24 of the equalizer bar 23. Next, and embodiment of the operation for separating the body is explained in the following order.

1. The bolt 17 is removed, and the endless track portion after the connecter board 60 is separated from the body 1.

In separating the body from the endless track portion, the cylinder 61 for lifting the blade and lipper 62 operated by oil pressure cylinder 64 are placed in the perpendicular direction of the body 1, and the body 1 is supported with the respective oil pressure cylinders 61 and 64.

The oil pressure cylinders 61 and 64 are predetermined so that the body 1 can be satisfactorily supported (see FIG. 7).

2. The belt assemblages 2 are spread outside by operating the bolt 12 or til pressure cylinder 5a on both ends of the pivot shaft 3 (see FIG. 8).

3. The body 1 is lifted with the cylinder 61 for lifting the blade and lipper 62, and the endless track portion F is self-operated to separate the endless track portion F from the body 1 (see FIG. 9).

4. The trailer 63 is proceded below the body 1, and then the body 1 is placed thereon. The endless track portion F is self-operated and is placed on another trailer (see FIG. 10).

The above are the explanations about the present invention, and yet the above given embodiment does not restrict the scope of the present invention, but a great number of modifications can be carried out.

What is claimed is:

1. A heavy bulldozer comprising a pair of right and left belt assemblages, each assemblage being composed of a sprocket and a front idler provided on opposite ends of a truck frame and having endless belts wound over said sprocket and idler, a body for supporting an engine and a power transmission mechanism for transmitting the power from the engine to the sprockets, diagonal braces projecting from inside the intermediate portions of the truck frames of said belt assemblages towards the other truck frame and extending to a position slightly forward of said sprockets, bearing casings fixed to said truck frames at a position slightly forward of said sprockets, a shaft pivotally supported by said bearing casings and the ends of said diagonal braces for connecting said pair of right and left belt assemblages, means for adjusting the length of said shaft whereby the distances between said assemblages may be varied, first upper half circular bearings formed on the lower surface of said body for supporting said body on said pivot shaft, first bearing caps removably mounted about said shaft to complete said bearings, a removable equalizer bar for connecting the front portions of said truck frames to each other, a second upper half circular bearing formed on the lower surface of the front portion of said body for containing the pin projected from said equalizer bar, a second bearing cap removably mounted to complete said second bearings, and a connecting mechanism for removably connecting said sprockets to the final output flanges of said power transmission mechanism.

2. A heavy bulldozer according to claim 1 wherein said adjusting means comprises a bolt whose head portion is fixed onto the outer end surface of said bearing casing and whose shaft is screwed into an end surface of said pivotally mounted shaft.

3. A heavy bulldozer according to claim 1, wherein said adjusting means comprises a piston head formed on one end of said pivotally mounted shaft and said head is inserted into the cylinder formed on the internal surface of said bearing casing.

4. A heavy bulldozer according to claim 1, wherein said power transmission mechanism comprises a variable speed gear.

5. A heavy bulldozer according to claim 1 further including extensible and contractible cylinders for lifting and elevating bulldozer blades and movable lippers provided at the front and rear portions of said body, said blade lifting cylinders and said lippers being disposed externally to said assemblages and being adapted to support the body of said bulldozer in a balanced orientation above said assemblages whereby said body may be moved vertically and horizontally under its own power.

* * * * *